United States Patent [19]

Lhonneur et al.

[11] Patent Number: 5,001,844

[45] Date of Patent: Mar. 26, 1991

[54] METHOD OF DRYING CARRAGEENANS

[75] Inventors: Jean-Pierre Lhonneur; Jacky Lefrancois, both of Carentan, France

[73] Assignee: Sanofi, France

[21] Appl. No.: 529,567

[22] Filed: May 29, 1990

[30] Foreign Application Priority Data

Jun. 1, 1989 [FR] France ............................ 89 07256

[51] Int. Cl.$^5$ ........................... F26B 3/34; A23L 1/05
[52] U.S. Cl. .......................................... 34/1; 426/242; 426/575
[58] Field of Search ...................... 34/1; 426/242, 575

[56] References Cited

U.S. PATENT DOCUMENTS

| 4,276,320 | 6/1981 | Moirano | 426/575 |
| 4,720,924 | 1/1988 | Hradecky et al. | 34/1 |
| 4,896,434 | 1/1990 | Fanelli | 34/1 |
| 4,915,506 | 4/1990 | Sato et al. | 34/1 X |

FOREIGN PATENT DOCUMENTS 2061728  5/1981  United Kingdom .

OTHER PUBLICATIONS

Derwent Abstract C89-042441, Taguchi.
Derwent Abstract C85-113296, House Shokuhin Kogy.
Derwent File Supplier, No. AN-87-210585, 1987, Onodera.
Derwent File Supplier, No. AN-79-764 55B, 1979, Hirata.

Primary Examiner—Henry A. Bennet
Assistant Examiner—C. Kilner
Attorney, Agent, or Firm—Bacon & Thomas

[57] ABSTRACT

The invention relates to a method of drying carrageenans extracted from red algae by alkaline treatment in an aqueous medium. This method consists in subjecting the moist fibers to the action of microwaves at 100 to 10,000 MHz in such a way that the temperature of the mass does not exceed 100° C. Application: preparation of carrageenans.

8 Claims, No Drawings

METHOD OF DRYING CARRAGEENANS

The present invention relates to a method of drying carrageenans, these being sulfated polysaccharides which are very widely used in the food industry for thickening, gelling or stabilizing suspensions, more particularly in milk-based media, and to the resulting carrageenans of improved dispersibility.

Carrageenans are extracted from red algae and more particularly from *Chrondrus crispus, Euchema cottonii, Euchema spinosum* or *Irideae species*; depending on their origin, different types of carrageenan, called lambda, iota or kappa carrageenans, are obtained which differ slightly in structure and properties.

Industrially, these products are obtained by macerating the group algae in hot water which has been rendered alkaline; after a few hours, the insoluble materials are separated off by hot filtration and the carrageenan is coagulated by the addition of an alcoholic solvent to the filtrate, generally by the addition of isopropanol. The fibers formed are isolated by filtration, drained and then rewashed with isopropanol before being drained again. The white fibrous mass obtained contains about 55% of polysaccharide, 15% of isopropanol and 30% of water. It is then dried under a paratial vacuum, at a temperature of between about 40° C. and 60° C., generally until the solids content is 10%. The fibers are then ground to give a low-density powder, which is rather difficult to handle and to bag. Moreover—and this is a major disadvantage—the powder is difficult to disperse in liquids, including milk, and if the dispersion is not agitated vigorously and the powder is not added slowly, lumps and aggregates form in the preparation.

The dispersibility of the polysaccharide is improved by compacting the moist fibers to a solids content of 20% in compacting rollers under a pressure of more than $10^8$ Pa; after grinding, a powder is isolated which still consists of broken filaments but whose density is greater than that of the powder obtained direct, for example 0.7 to 0.8 instead of 0.3 to 0.4, and, in particular, whose dispersibility in water or milk is satisfactory; nevertheless, this method has a number of disadvantages, including the cost of investment in equipment and a certain operating difficulty, especially because it is complicated to feed the compacter continuously with the fibers.

Another way of improving the dispersibility which may be considered is to mix with the powder a small proportion of an edible surfactant such as lecithin or sorbitan esters. However, the use of these products is not authorized in all countries and, in particular, they are not transparent in aqueous solution.

It has also been recommended to use carrageenans as a mixture with bulking agents, for example sugars or salts, but this is unsuitable for some applications.

It has now been found that drying the moist fibers under particular conditions produces a powder which is fairly dense and readily dispersible in aqueous or milky media and which also has substantially the same physicochenmical properties as the powder obtained by conventional drying.

The method according to the invention consists in drying the water-impregnated fibers in a microwave chamber at ordinary pressure instead of drying them in a dryer under vacuum at a temperature of between 40° C. and 60° C. and under a pressure of between about $10^5$ and $10^6$ Pa.

Before being subjected to the action of microwaves, the water-impregnated fibers will contain from 20% to 100% of their weight of water.

These fibers can be those isolated at the end of the extraction process after washing and draining; apart from water, there is then a certain amount of isopropanol and, especially because of the risks of ignition and the toxicity of the alcohol, it is preferred to predry the mass in a conventional oven, under vacuum if necessary, until the isopropanol content is reduced to 5% or less.

This method can also be applied to the fibers dried in conventional manner, after they have been mixed with a small amount of water in a malaxator; the proportions of water of be used can vary within wide limits; in general, it suffices to make the fibers into a paste again with the same weight of water.

Drying can be carried out using any microwave oven such as those currently marketed for drying industrial products by the company FAMO—Villefranche S/Saone (FR), of the AIMT AM series, or by the companies APV Magnetronics (GB) or IMI Epone (FR). Generally, in France, these apparatuses have an emission frequency of 915 or 2450 MHz, but this frequency is not critical and it is possible to use emitters between 100 and 10,000 MHz when their use is authorized in the country in which the operation is carried out.

It is known that, on average, 1 kg of water is evaporated per kW supplied per hour, and the treatment time depends essentially on the quantity of energy received per unit volume, the quantity of moisture initially present in the mass and the thickness of the latter, but it is important that the temperature inside the mass of carrageenan should not exceed 100° C. or preferably 95° C., so as to avoid any decomposition of the polysaccharide.

The operation is preferably carried out with devices which permit continuous drying, the carrageenans being introduced into the irradiated zone by a conveyor belt made of a material inert to microwaves.

The appearance of the fibers is not modified during this drying operation, in contrast to what is observed with other macromolecules and especially with proteins such as egg white, whose macroscopic network is expanded when they are subjected to microwaves in the presence of water. On the contrary, the density of the powder obtained after grinding of the fibers dried in this way is greater than that of the powder obtained after conventional drying.

The kappa carrageenans and their gelling mixtures with the lambda and iota carrageenans, dried by the conventional method until the solids content is 95%, are flaky and the fibers, which are difficult to grind, always give a cottony powder of density 0.3–0.4; by contrast, with microwave drying, the fibers with a solids content of 93–95% can be ground and they give a powder with a greater density of about 0.5, which is fluid and non-cottony.

The lambda and iota carrageenans are generally dried, by the conventional method, until the solids content is 90 to 92%; they can be ground and they give a fluid powder; with microwave drying, however, it suffices to have a solids content of 83 to 85%, which will be sufficiently dense to give a non-flaky powder with a solids content of 90–95% after grinding.

Moreover, the dispersibility of the powders in aqueous or milky media is improved: appreciably fewer lumps are formed with gentle agitation or without raising the temperature.

A further advantage of the method according to the invention is that is improves the bacteriological quality of the powder obtained: the number of germs per gram is less than that in the case of conventional drying.

The powder dried in this way has the same rheological properties as a powder dried under the conventional conditions and its taste is not modified; it can also be used in all the conventional applications of carrageenans, such as cocoa-flavored milk, ice creams, baked custards and analogous products.

An Example of the method according to the invention is described below.

EXAMPLE:

A microwave oven emitting at 2450 MHz is used. The carrageenan, which is a compressed extract of *Euchema cottonii* containing 35% of water and 15% of isopropanol by weight, is predried to 30% of water and 15% of isopropanol and is then introduced into the oven on a conveyor belt on which it has been deposited to a uniform thickness of between 5 and 10 cm; the speed of the belt depends on the length of the oven, the amount of water in the product when it enters and the solids content fixed for the product when it leaves. In general, with a belt speed of 0.1 to 5 m/min, the mean residence time is 5 to 15 minutes for a product containing about 30% of water when it enters an oven equipped with forty-eight 800 watt generators; the resulting carrageenan fibers, which have a solids content of 93-94%, are ground in a hammer mill, in the same way as the fibers obtained from a vacuum dryer, and are then sieved. The powder obtained is homogeneous, fluid and does not agglomerate, in contrast to that resulting from conventional drying.

What is claimed is:

1. A method of drying carrageenans extracted from red algae by alkaline treatment in an aqueous medium, wherein the moist fibers are subjected to the action of microwaves at 100 to 10,000 MHz in such a way that the temperature of the mass does not exceed 100° C.

2. A method according to claim 1, wherein the fibers are predried to remove the isopropanol until the isopropanol content is reduced to 5% or less.

3. A method according to claim 1, wherein the frequency of the microwaves is 2450 MHz.

4. A method according to claim 1, which is carried out continuously, the carrageenans being introduced into the microwave oven on a conveyor belt.

5. Kappa carrageenans having an improved dispersibility in liquid media, which are dried by the method according to claim 1.

6. Kappa carrageenans as a mixture with iota and lambda carrageenans, having an improved dispersibility in liquid media, wherein the extract of red algae is dried by the method according to claim 1.

7. Kappa carrageenans having an improved dispersibility in liquid media, which are dried by the method according to claim 2.

8. Kappa carrageenans as a mixture with iota and lambda carrageenans, having an improved dispersibility in liquid media, wherein the extract of red algae is dried by the method according to claim 2.

* * * * *